(12) United States Patent
Nagai et al.

(10) Patent No.: US 8,148,002 B2
(45) Date of Patent: Apr. 3, 2012

(54) ELECTRIC STORAGE DEVICE

(75) Inventors: Mitsuru Nagai, Tokyo (JP); Takashi Utsunomiya, Tokyo (JP); Kunio Nakazato, Tokyo (JP); Nobuo Ando, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 557 days.

(21) Appl. No.: 12/363,840

(22) Filed: Feb. 2, 2009

(65) Prior Publication Data
US 2009/0197175 A1 Aug. 6, 2009

(30) Foreign Application Priority Data

Feb. 4, 2008 (JP) ................................. 2008-024036

(51) Int. Cl.
*H01M 2/08* (2006.01)
*H01M 2/16* (2006.01)
*H01M 4/48* (2010.01)
*H01M 4/58* (2010.01)
*H01G 9/145* (2006.01)

(52) U.S. Cl. ........ 429/136; 429/142; 429/144; 429/145; 429/185; 429/247; 429/254; 361/502

(58) Field of Classification Search .................. None
See application file for complete search history.

(56) References Cited

U.S. PATENT DOCUMENTS

| | | | | |
|---|---|---|---|---|
| 5,741,608 | A * | 4/1998 | Kojima et al. ................... | 429/94 |
| 6,287,720 | B1 * | 9/2001 | Yamashita et al. ............. | 429/131 |
| 6,335,114 | B1 * | 1/2002 | Ueshima et al. ................ | 429/94 |
| 7,817,403 | B2 * | 10/2010 | Tasaki et al. ................... | 361/512 |
| 2005/0031947 | A1 * | 2/2005 | Yamada et al. ................ | 429/162 |
| 2005/0186468 | A1 * | 8/2005 | Kosuda et al. ................ | 429/130 |
| 2007/0292750 | A1 * | 12/2007 | Beard ........................... | 429/101 |
| 2008/0055819 | A1 * | 3/2008 | Taguchi et al. ................ | 361/504 |
| 2009/0097189 | A1 * | 4/2009 | Tasaki et al. ................... | 361/512 |
| 2009/0123823 | A1 * | 5/2009 | Ando et al. ..................... | 429/129 |

FOREIGN PATENT DOCUMENTS

JP 2006-286919 A 10/2006

* cited by examiner

*Primary Examiner* — George Suchfield
(74) *Attorney, Agent, or Firm* — McDermott Will & Emery LLP

(57) ABSTRACT

An electric storage device 10 has a positive electrode 13, a negative electrode 14 and a separator 15 provided between the positive electrode 13 and the negative electrode 14. The negative electrode surface 14b is formed to be larger than the positive electrode surface 13b in such a manner that a positive electrode outer edge 13c and a negative electrode outer edge 14c are apart from each other by 2 mm or more. By this configuration, an ion restricting section 15b is formed at the outer peripheral portion of the separator 15. Accordingly, the movement of the lithium ions toward the negative electrode end surface 14a can be restricted, when the device is charged with a large current, whereby the deposition of metal lithium on the negative electrode end surface 14a can be prevented.

12 Claims, 10 Drawing Sheets

ELECTRIC STORAGE DEVICE

CROSS-REFERENCE TO RELATED APPLICATIONS

The disclosure of Japanese Patent Application No. 2008-024036 filed on Feb. 4, 2008 including the specification, drawings, and abstract is incorporated herein by reference in its entirety.

BACKGROUND OF THE INVENTION

1. Field of the Invention

The present invention relates to a technology that is effective when applied to an electric storage device.

2. Description of the Related Arts

A lithium ion secondary battery or a lithium ion capacitor has been proposed as an electric storage device that is mounted on an electric vehicle, hybrid vehicle, or the like (see JP-A-2006-286919). A lithium cobalt oxide or the like is contained in a positive electrode of the lithium ion secondary battery as a positive-electrode active material. A graphite or the like is contained in a negative electrode of the lithium ion secondary battery as a negative-electrode active material. An activated carbon is contained in a positive electrode of the lithium ion capacitor as a positive-electrode active material. A PAS or the like is contained in a negative electrode of the lithium ion capacitor as a negative-electrode active material. When these electric storage devices are charged or discharged, lithium ions move between the opposite electrodes.

A separator is provided between the electrodes of the electric storage device. The separator is impregnated with an electrolyte solution serving as a moving path of the lithium ions. Therefore, the lithium ions move between the surfaces of the electrodes that are in contact with the separator when the device is charged or discharged. However, there may be the case in which the lithium ions go into the end surfaces of the electrodes depending upon the magnitude of the charging current or discharging current.

As disclosed in JP-A-2006-286919, a metallic current collector is exposed at the end surface of the electrode of the electric storage device. Therefore, when the lithium ions go into the end surface of the electrode, the lithium ions are adsorbed onto the current collector on the end surface of the electrode. In this case, the current collector cannot take in the lithium ions so that the metal lithium might be deposited from the exposed surface of the current collector. The deposition of the metal lithium causes short-circuit between the electrodes, thereby deteriorating the safety of the electric storage device. Particularly, in a lithium ion capacitor or the like that aims to increase an output, it is important to prevent the lithium ions from going into the end surface of the electrode.

SUMMARY OF THE INVENTION

An object of the present invention is to enhance safety of an electric storage device.

An electric storage device according to the present invention comprises: a positive electrode; a negative electrode having a negative electrode surface larger than a positive electrode surface; and a separator arranged between the positive electrode and the negative electrode that are opposite to each other, wherein a positive electrode active material contained in the positive electrode allows ions to be reversibly doped thereinto and de-doped therefrom; a negative electrode active material contained in the negative electrode allows ions to be reversibly doped thereinto and de-doped therefrom; the positive electrode is arranged not to protrude from the negative electrode; and the separator is provided with an ion passing section that is in contact with the positive electrode surface and the negative electrode surface so as to allow the movement of ions between the surfaces, and an ion restricting section that is positioned at the outer peripheral portion of the ion passing section for restricting the movement of ions from the positive electrode surface to an end surface of the negative electrode.

An electric storage device according to the present invention is characterized in that an outer edge of the positive electrode and an outer edge of the negative electrode are apart from each other by 2 mm or more and 15 mm or less.

An electric storage device according to the present invention is characterized in that the separator is formed to be larger than the positive electrode surface and to be smaller than the negative electrode surface, and an outer edge of the separator is arranged outside of an outer edge of the positive electrode and inside of an outer edge of the negative electrode.

An electric storage device according to the present invention is characterized in that the separator is formed into a bag-like shape, and the positive electrode is accommodated in the separator.

An electric storage device according to the present invention is characterized in that the separator is formed to be larger than the negative electrode surface.

An electric storage device according to the present invention is characterized in that a sealing process is performed to the outer peripheral portion of the separator not crossing over the ion restricting section.

An electric storage device according to the present invention is characterized in that the sealing process is application of a resin material.

An electric storage device according to the present invention is characterized in that the separator is a thermoplastic material, and the sealing process is heating treatment.

An electric storage device according to the present invention further comprises: an ion supply source that is connected to at least one of the positive electrode and the negative electrode for doping ions into at least one of the positive electrode and the negative electrode.

An electric storage device according to the present invention is characterized in that a current collector between the positive electrode and the negative electrode has through-holes formed therethrough.

The electric storage device according to the present invention is characterized in that the potential of the positive electrode when the positive electrode and the negative electrode are short-circuited is 2.0 V or less (vs. Li/Li$^+$).

An electric storage device according to the present invention is characterized in that the negative electrode active material contained in the negative electrode has a capacitance per negative electrode active material weight three times or more larger than a capacitance of the positive electrode active material per positive electrode active material weight contained in the positive electrode, and the weight of the positive electrode active material is larger than the weight of the negative electrode active material.

An electric storage device according to the present invention is characterized in that the positive electrode active material is activated carbon, lithium-containing transition metal oxide, transition metal oxide, transition metal sulfide, conductive polymer, or polyacene-based substance.

An electric storage device according to the present invention is characterized in that the negative electrode active material is carbon material including graphite, hard carbon and polyacene-based material, tin oxide, or silicon oxide lithium.

In the present invention, the ion passing section, which is in contact with the positive electrode surface and the negative electrode surface for allowing the movement of ions between the surfaces, is provided to the separator. Further, the ion restricting section that is positioned outside of the ion passing section for restricting the movement of ions from the positive electrode surface to the end surface of the negative electrode is provided to the separator. By this configuration, the movement of ions from the positive electrode surface to the end surface of the negative electrode can be restricted, whereby the deposition of metal on the end surface of the negative electrode can be prevented. Accordingly, the safety of the electric storage device can be enhanced.

DETAILED DESCRIPTION OF THE PREFERRED EMBODIMENTS

Figure 1:
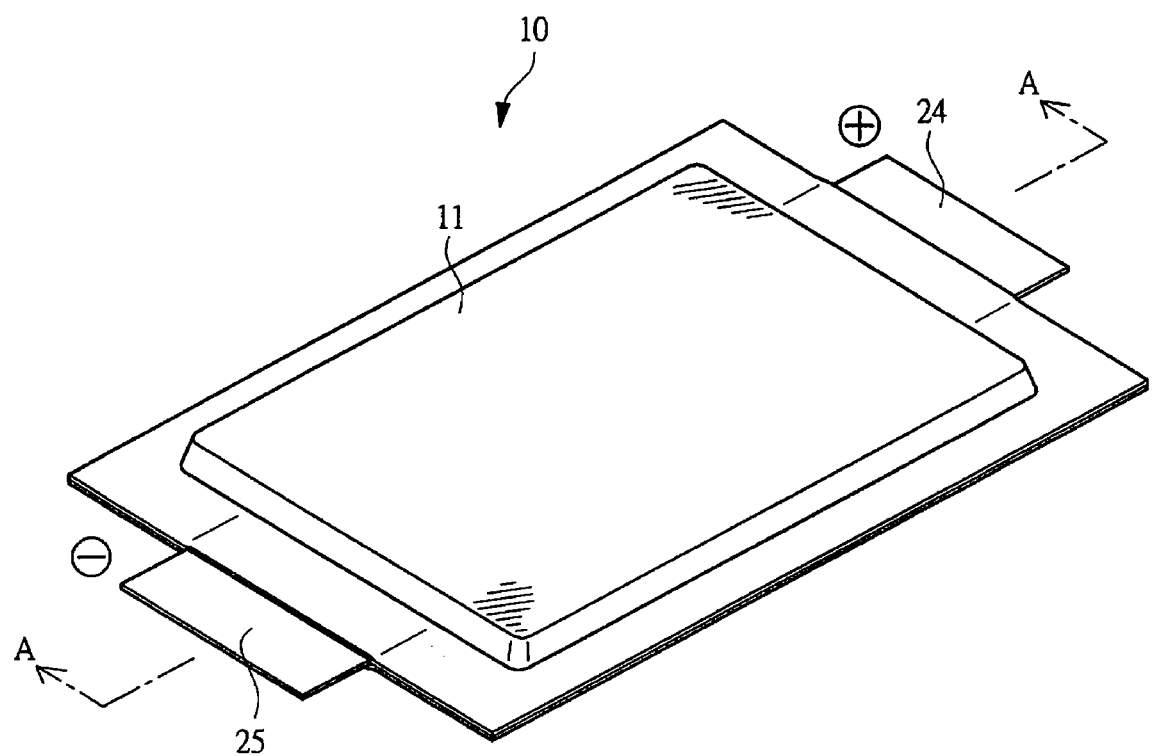
FIG. 1 is a perspective view showing an electric storage device according to one embodiment of the present invention.
Figure 2:
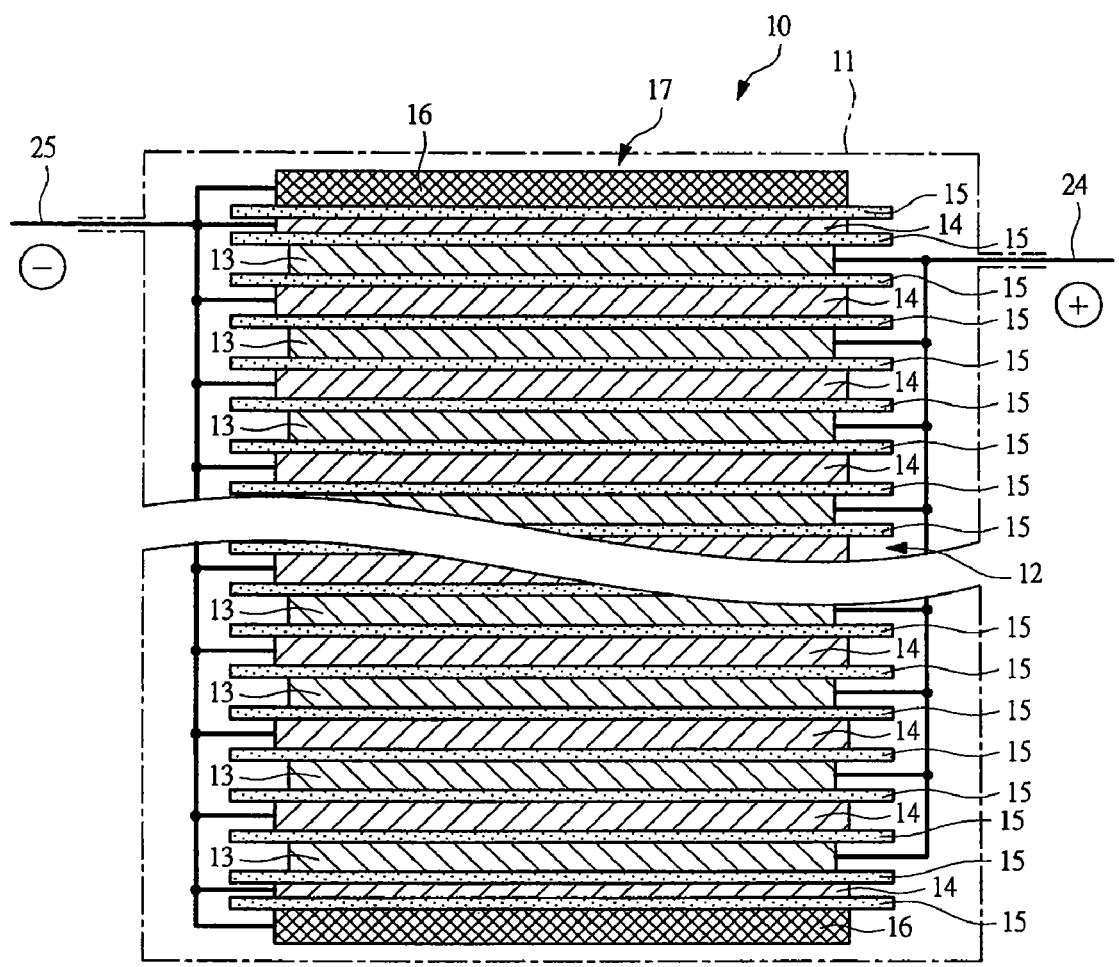
FIG. 2 is a sectional view schematically showing an internal structure of the electric storage device taken along a line A-A in FIG. 1.

FIG. 1 is a perspective view showing an electric storage device 10 according to one embodiment of the present invention. FIG. 2 is a sectional view schematically showing an internal structure of the electric storage device 10 taken along a line A-A in FIG. 1. As shown in FIGS. 1 and 2, a laminate film 11 of the electric storage device 10 constitutes an outer casing. An electrode laminate unit 12 is accommodated in the laminate film 11. The electrode laminate unit 12 is composed of positive electrodes 13 and negative electrodes 14 that are laminated alternately. A separator 15 is provided between each of the positive electrodes 13 and each of the negative electrodes 14. A lithium electrode 16 is arranged at the outermost part of the electrode laminate unit 12 so as to be opposite to the negative electrode 14. The separator 15 is provided between the negative electrode 14 and the lithium electrode 16. The electrode laminate unit 12 and the lithium electrode 16 constitute the three-electrode laminate unit 17. An electrolyte solution is injected into the laminate film 11 so as to be impregnated into the separator 15. The electrolyte solution is made of aprotic organic solvent containing lithium salt.

Figure 3:
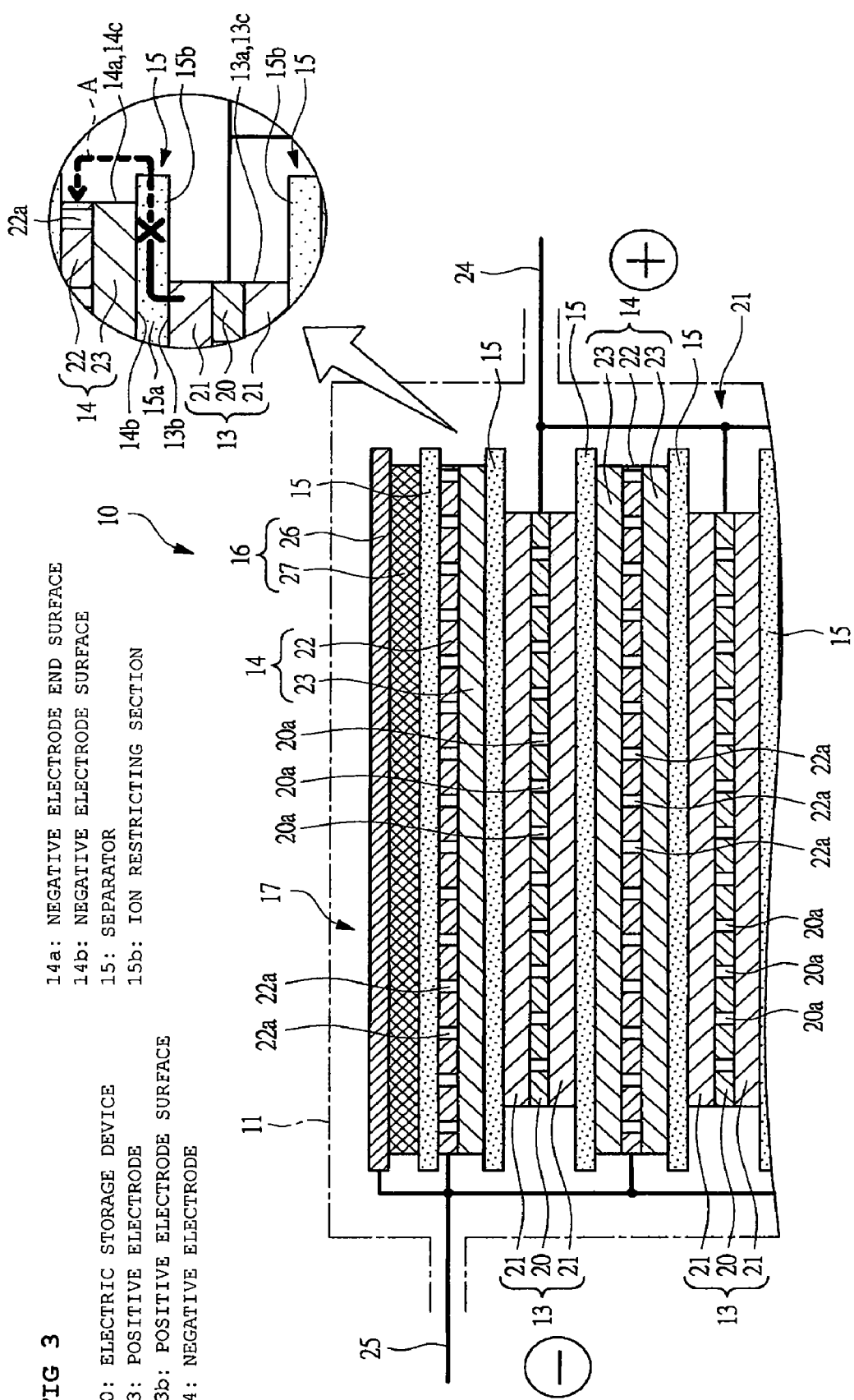
FIG. 3 is a sectional view partially showing the internal structure of the electric storage device.

FIG. 3 is a sectional view partially showing the internal structure of the electric storage device 10. As shown in FIG. 3, each of the positive electrodes 13 has a positive-electrode current collector (current collector) 20 formed with a large number of through-holes 20a. Each of the positive electrodes 13 has a positive-electrode mixture layer 21 coated on the positive-electrode current collector 20. On the other hand, each of the negative electrodes 14 has a negative-electrode current collector (current collector) 22 formed with a large number of through-holes 22a. Each of the negative electrodes 14 has a negative-electrode mixture layer 23 coated on the negative-electrode current collector 22. The positive-electrode current collector 20 and the negative-electrode current collector 22 are exposed at the positive electrode end surface 13a and the negative electrode end surface 14a. This is because, when an electrode is fabricated, a mixture layer is coated on an elongated material of the current collector, and then the material of the current collector is cut into a predetermined shape.

A plurality of the positive-electrode current collectors 20 are connected to each other, and connected to a positive electrode terminal 24. A plurality of the negative electrode current collectors 22 are connected to each other, and connected to a negative electrode terminal 25. The positive electrode terminal 24 and the negative electrode terminal 25 are exposed to the outside from the laminate film 11. The lithium electrode 16 has a lithium-electrode current collector 26 connected to the negative-electrode current collector 22. The lithium electrode 16 has a lithium ion source 27 pressedly fixed to the lithium-electrode current collector 26. The lithium ion source 27 serves as a source for supplying ions to the negative electrodes 14 or the positive electrodes 13. A metal lithium foil obtained by thinly extending metal lithium is used as the lithium ion source 27.

The positive-electrode mixture layer 21 of each of the positive electrodes 13 contains an activated carbon as a positive-electrode active material. The activated carbon allows lithium ions or anions to be reversibly doped thereinto and de-doped therefrom. The negative-electrode mixture layer 23 of each of the negative electrodes 14 contains a polyacene-based organic semiconductor (PAS) as a negative-electrode active material. The PAS allows lithium ions to be reversibly doped thereinto and de-doped therefrom. The negative electrode 14 and the lithium electrode 16 are electrically connected. By this configuration, lithium ions are doped into the negative electrode 14 from the lithium electrode 16 according to the injection of the electrolyte solution. Thus, the potential of the negative electrode can be reduced, whereby the cell voltage of the electric storage device 10 can be increased. Accordingly, the energy density of the electric storage device 10 can be enhanced.

The lithium ions can be moved in the vertical direction to the current collectors 20 and 22 through the through-holes 20a and 22a of the positive-electrode current collectors 20 and the negative-electrode current collectors 22. Thus, the lithium ions can smoothly be doped into all of the negative electrodes 14. In the present invention, the term "doping (dope)" involves "occlude", "carry", "absorb", "insert", or the like and specifically a phenomenon where lithium ions and/or anions enter the positive-electrode active material or the negative-electrode active material. The term "de-doping (de-dope)" involves "release" and "desorb", and specifically a phenomenon where lithium ions or anions desorb from the positive-electrode active material or the negative-electrode active material.

In order to increase the capacity of the electric storage device 10, the amount of doped lithium ions to the negative electrode 14 is set such that the potential of the positive electrode after short-circuiting the positive electrode 13 and the negative electrode 14 becomes 2.0 V or less (vs. Li/Li$^+$). By setting the amount of the doped lithium ions as described above, the area where the potential of the positive electrode becomes 3 V or less can be used. In a case where a conventional electric double layer capacitor is to be discharged, the potential of the negative electrode rises to about 3 V when the potential of the positive electrode lowers to about 3 V. Accordingly, the discharge of the conventional electric double layer capacitor ends at the time when the potential of the positive electrode lowers to about 3 V. On the other hand, in the electric storage device 10, the discharge can be continued to the area where the potential of the positive electrode becomes 2 V or less by adjusting the amount of the doped lithium ions to the negative electrode 14. Therefore, the area where the potential of the positive electrode becomes 3 V or less can be used, and the capacity of the electric storage device 10 can be increased. Notably, the potential changes by the dope or de-dope of the anions to or from the positive electrode 13 at the area where the potential of the positive electrode exceeds 3 V. The potential changes by the dope or de-dope of the lithium ions to or from the positive electrode 13 at the area where the potential of the positive electrode is 3 V or less.

In order to increase the capacity of the electric storage device 10, the capacitance per negative-electrode active material weight is set to be three times or more larger than the capacitance per positive-electrode active material weight. Since the capacitance per negative-electrode active material weight is set to be larger than the capacitance per positive-electrode active material weight, the amount of the change in the potential of the negative electrode when charging or discharging the device can be suppressed, whereby the amount of the change in the potential of the positive electrode 13 can be increased. In the electric storage device 10, the capacitance per negative-electrode active material weight is large. Therefore, the amount of the positive-electrode active material is increased, while the amount of the negative-electrode active material is reduced, in order that the positive-electrode active material weight is larger than the negative-electrode active material weight. By this configuration, the capacitance and the cell capacity of the electric storage device 10 can be increased, while preventing the electric storage device 10 from increasing in size.

As described above, the electric storage device 10 contains an activated carbon as a positive-electrode active material, and the PAS as a negative-electrode active material. Since the PAS has a resistance higher than that of the activated carbon, the tolerable doping speed of the PAS is lower than that of the activated carbon. Thus, the doping speed to the PAS in the negative electrode 14 might exceed the tolerable value depending upon the current value at the time of charging. The abrupt dope of the lithium ions with the speed exceeding the tolerable speed causes the excess lithium ions which cannot be doped into the negative-electrode active material and the movement of the excess lithium ions from the positive electrode surface 13b to the negative electrode end surface 14a. The negative-electrode current collector 22 is exposed at the negative electrode end surface 14a. Therefore, the lithium ions moving onto the negative electrode end surface 14a are electrodeposited on the metallic negative-electrode current collector 22. Specifically, the abrupt dope of the lithium ions with the speed exceeding the tolerable speed causes the deposition of the metal lithium from the negative-electrode current collector 22. In view of this, the electric storage device 10 according to the present invention has an electrode structure for preventing the deposition of the metal lithium. The electrode structure of the electric storage device 10 according to the present invention will be described below.

Figure 4:
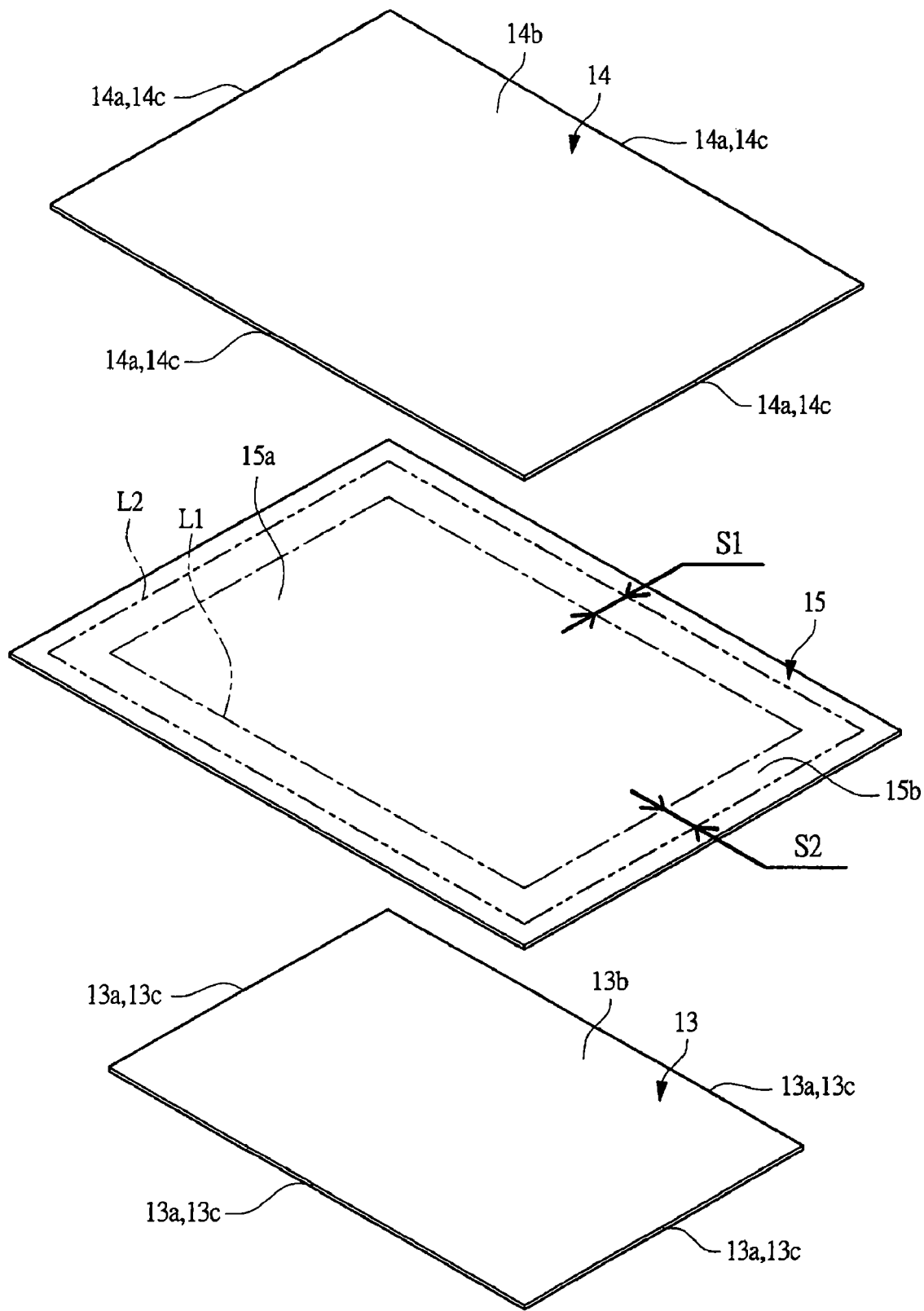
FIG. 4 is an exploded perspective view showing a positive electrode, negative electrode and separator, which constitute the electric storage device.

FIG. 4 is an exploded perspective view showing the positive electrode 13, the negative electrode 14 and the separator 15, which constitute the electric storage device 10. A one-dot-chain line L1 in FIG. 4 indicates the position of the positive electrode outer edge 13c when the positive electrode 13 is superimposed onto the separator 15. A two-dot-chain line L2 in FIG. 4 indicates the position of the negative electrode outer edge 14c when the negative electrode 14 is superimposed on the separator 15. In FIG. 4, the welding parts of the current collectors extending from the positive electrode 13 or the negative electrode 14 are omitted. As shown in FIG. 4, the negative electrode surface 14b is formed to be larger than the positive electrode surface 13b. Therefore, when the positive electrode 13 and the negative electrode 14 are superimposed, the negative electrode outer edge 14c is positioned outside of the positive electrode outer edge 13c. In order to prevent the deposition of the metal lithium, the spaces S1 and S2 between the positive electrode outer edge 13c and the negative electrode outer edge 14c are set to be 2 mm or more. When the spaces S1 and S2 are too large, the energy density reduces. Therefore, in order to suppress the reduction in the energy density of the electric storage device 10, the spaces S1 and S2 between the positive electrode outer edge 13c and the negative electrode outer edge 14c are set to be 15 mm or less. The separator 15 is formed to be larger than the positive electrode surface 13b to prevent an internal short-circuit in the electric storage device 10 due to the thermal shrinkage of the separator 15.

Figure 5:
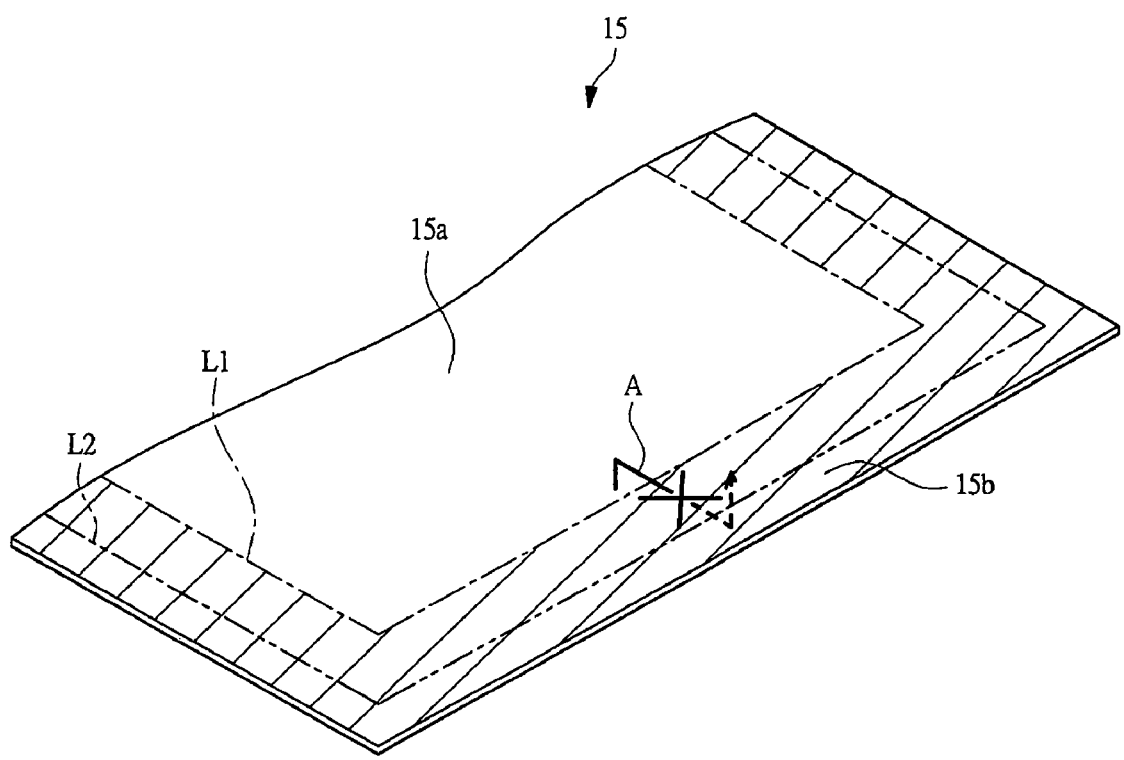
FIG. 5 is an explanatory view showing an ion passing section and an ion restricting section formed on the separator.

As described above, the negative electrode surface 14b is formed to be larger than the positive electrode surface 13b in order that the positive electrode outer edge 13c and the negative electrode outer edge 14c are apart from each other by 2 mm or more. Thus, an ion restricting section 15b is formed in the separator 15. The ion restricting section 15b functions to restrict the movement of the lithium ions (ion movement) from the positive electrode surface 13b to the negative electrode end surface 14a. FIG. 5 is an explanatory view showing the ion passing section 15a and the ion restricting section 15b formed to the separator 15. Like FIG. 4, the one-dot-chain line L1 in FIG. 5 indicates the position of the positive electrode outer edge 13c overlapped with the separator 15. Like FIG. 4, the two-dot-chain line L2 in FIG. 5 indicates the position of the negative electrode outer edge 14c overlapped with the separator 15.

As shown by a white part in FIG. 5, the ion passing section 15a is formed in the separator 15 inside of the one-dot-chain line L1. The ion passing section 15a is in contact with both the positive electrode surface 13b and the negative electrode surface 14b. The lithium ions pass through the ion passing section 15a in the thickness direction at the time of charging or discharging, so that the lithium ions move between the positive electrode surface 13b and the negative electrode surface 14b. As shown by a hatched area in FIG. 5, the ion restricting section 15b is formed in the separator 15 outside of the one-dot-chain line L1. The ion restricting section 15b is located outside of the ion passing section 15a. The ion restricting section 15b is arranged between the positive electrode surface 13b and the end surface 14a of the negative electrode. The movement of the lithium ions from the positive electrode surface 13b to the negative electrode end surface 14a is restricted at the time of charging.

Specifically, as shown by an arrow A in an enlarged view in FIG. 3, the lithium ions should pass through the ion restricting section 15b in order that the lithium ions reach the negative electrode end surface 14a from the positive electrode surface 13b. However, the ion restricting section 15b is formed to have a width of 2 mm or more. This thickness is extremely large compared to the thickness of the separator 15. Therefore, the resistance of the moving path of the lithium ions remarkably increases at the ion restricting section 15b, compared to the resistance of the moving path of the lithium ions in the thickness direction. Accordingly, even when the electric storage device 10 is charged with a large current, the movement of the lithium ions to the negative electrode end surface 14a can be restricted by the ion restricting section 15b. Thus, the deposition of the metal lithium on the negative-electrode current collector 22 at the negative electrode end surface 14a can be prevented. Moreover, the safety and quality of the electric storage device 10 can be enhanced. The x mark of the arrow A in FIGS. 3 and 5 indicates that the movement of the lithium ions is blocked at the ion restricting section 15b at the position marked with x.

In the aforesaid description, the negative electrode surface 14b is formed to be larger than the positive electrode surface 13b in such a manner that the positive electrode outer edge 13c and the negative electrode outer edge 14c are apart from each other by 2 mm or more. By this configuration, the movement of the lithium ions from the positive electrode surface 13b to the negative electrode end surface 14a is restricted. However, the invention is not limited to the aforesaid configuration. The movement of the lithium ions from the positive electrode surface 13b to the negative electrode end surface 14a can be restricted by the other configuration. Next, another embodiment of the present invention will be described.

Figure 6:
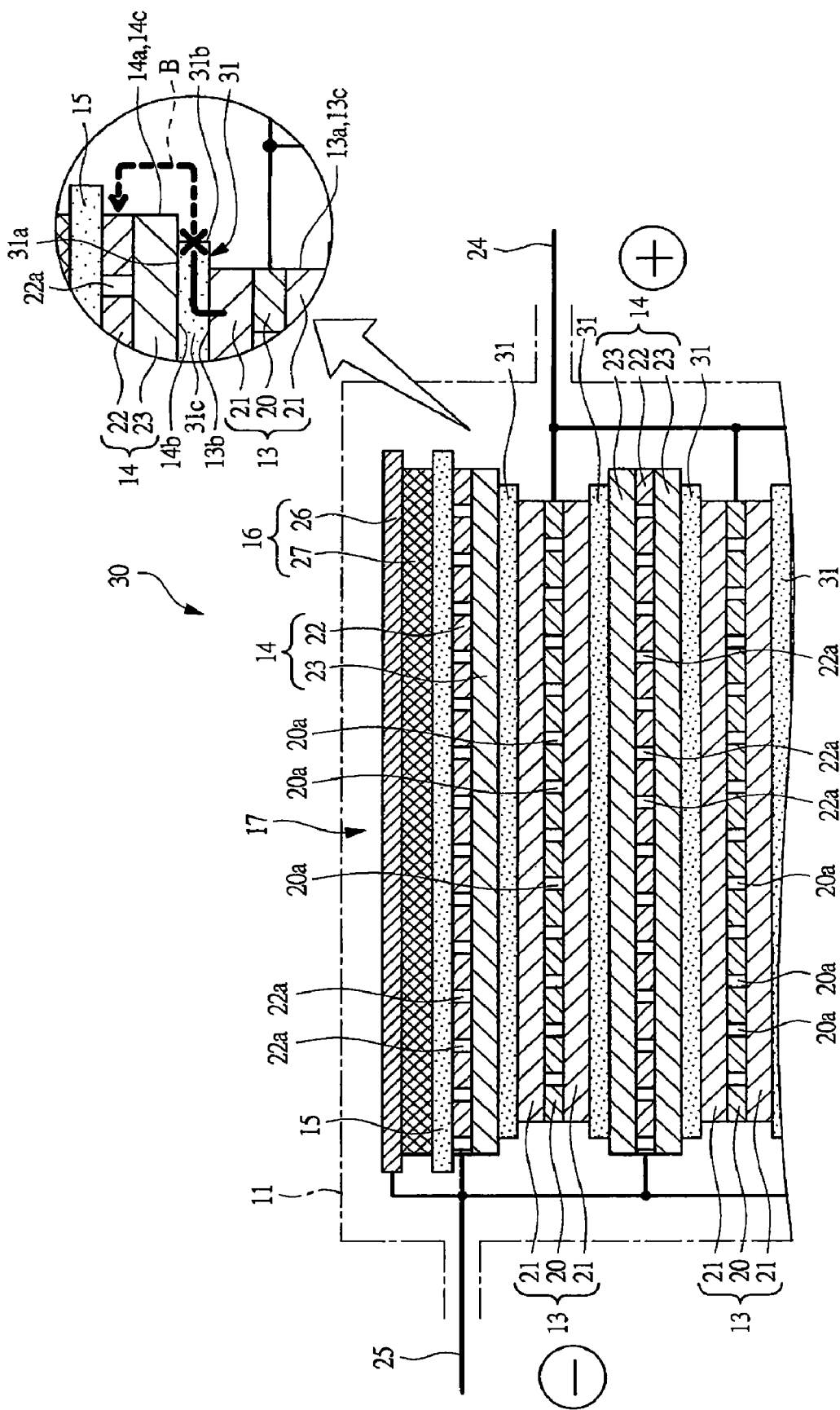
FIG. 6 is a sectional view partially showing the internal structure of an electric storage device according to another embodiment.
Figure 7:
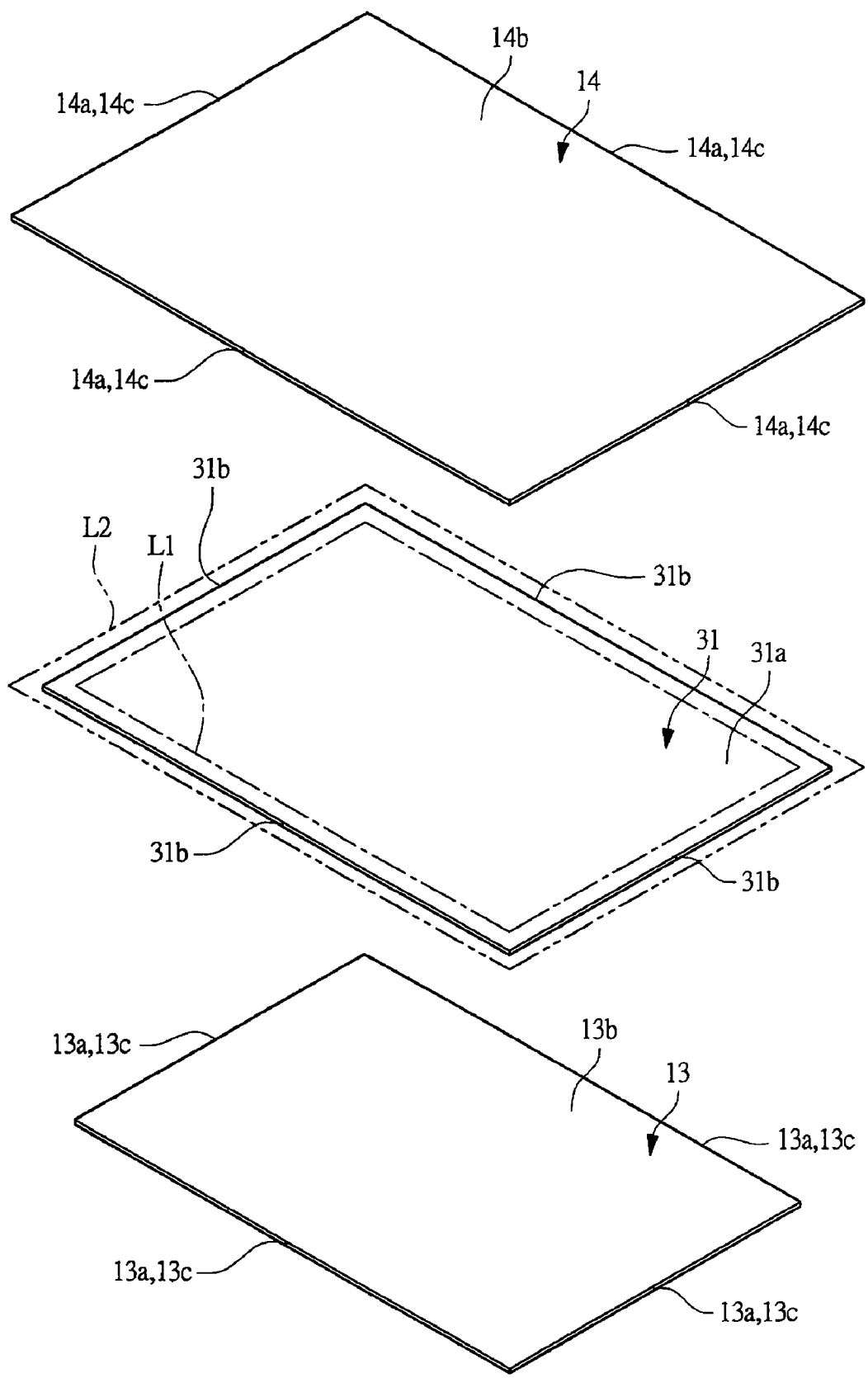
FIG. 7 is an exploded perspective view showing a positive electrode, negative electrode and separator, which constitute the electric storage device according to another embodiment of the present invention.

FIG. 6 is a sectional view partially showing an internal structure of an electric storage device 30 according to another embodiment of the present invention. FIG. 7 is an exploded perspective view showing the positive electrode 13, negative electrode 14, and separator 31, which constitute the electric storage device 30. The components same as those shown in FIGS. 3 and 4 are identified by the same numerals, and the explanation thereof are omitted. Like FIG. 4, the one-dot-chain line L1 in FIG. 7 indicates the position of the positive electrode outer edge 13c overlapped with the separator 31. Like FIG. 4, the two-dot-chain line L2 in FIG. 7 indicates the position of the negative electrode outer edge 14c overlapped with the separator 31. The welding parts of the current collectors extending from the positive electrode 13 and the negative electrode 14 are omitted.

As shown in FIGS. 6 and 7, the negative electrode surface 14b is formed to be larger than the positive electrode surface 13b. Therefore, when the positive electrode 13 and the negative electrode 14 are superimposed, the negative electrode outer edge 14c is located outside of the positive electrode outer edge 13c. The separator 31 is provided between the positive electrode 13 and the negative electrode 14. The separator surface 31a is formed to be larger than the positive electrode surface 13b and smaller than the negative electrode surface 14b. Specifically, the separator outer edge 31c is arranged outside of the positive electrode outer edge 13c and inside of the negative electrode outer edge 14c. Like the separator 15 of the electric storage device 10 described above, the area encircled by the one-dot-chain line L1 serves as an ion passing section 31c in the separator 31 of the electric storage device 30.

As described above, the separator outer edge 31c is arranged outside of the positive electrode outer edge 13c and inside of the negative electrode outer edge 14c. Thus, the separator outer edge 31b can function as the ion restricting section. Specifically, as indicated in an enlarged view in FIG. 6, the separator outer edge 31b does not reach the negative electrode end surface 14a. Accordingly, the electrolyte solution is not filled in the vicinity of the negative electrode end surface 14a. Consequently, as indicated by an arrow B in FIG. 6, the moving path of the lithium ions between the positive electrode surface 13b and the negative electrode end surface 14a is blocked by the separator outer edge 31c. By this configuration, even when the electric storage device 30 is charged with a large current, the movement of the lithium ions is restricted by the separator outer edge 31c serving as the ion restricting section. By the restriction of the ion movement, the deposition of the metal lithium on the negative-electrode current collector 22 at the negative electrode end surface 14a can be prevented. Moreover, the safety and quality of the electric storage device 30 can be enhanced. The x mark of the arrow B in FIG. 6 indicates that the movement of the lithium ions is blocked at the separator outer edge 31b at the position marked with x. In the embodiment shown in FIG. 6, the separator 31 is formed to be smaller than the negative electrode surface 14b. From a point of view of raising the energy density of the electric storage device, it is preferable to form the separator as small as possible on the condition that sufficient safety of the device is ensured. Thus, the separator is not always required to be larger than the negative electrode as long as a sufficient margin to prevent the short-circuit between the positive electrode and the negative electrode is left. Hence, the ion restricting section serves as the margin for the thermal shrinkage of the separator 31 in the embodiment shown in FIG. 6.

Figure 8:
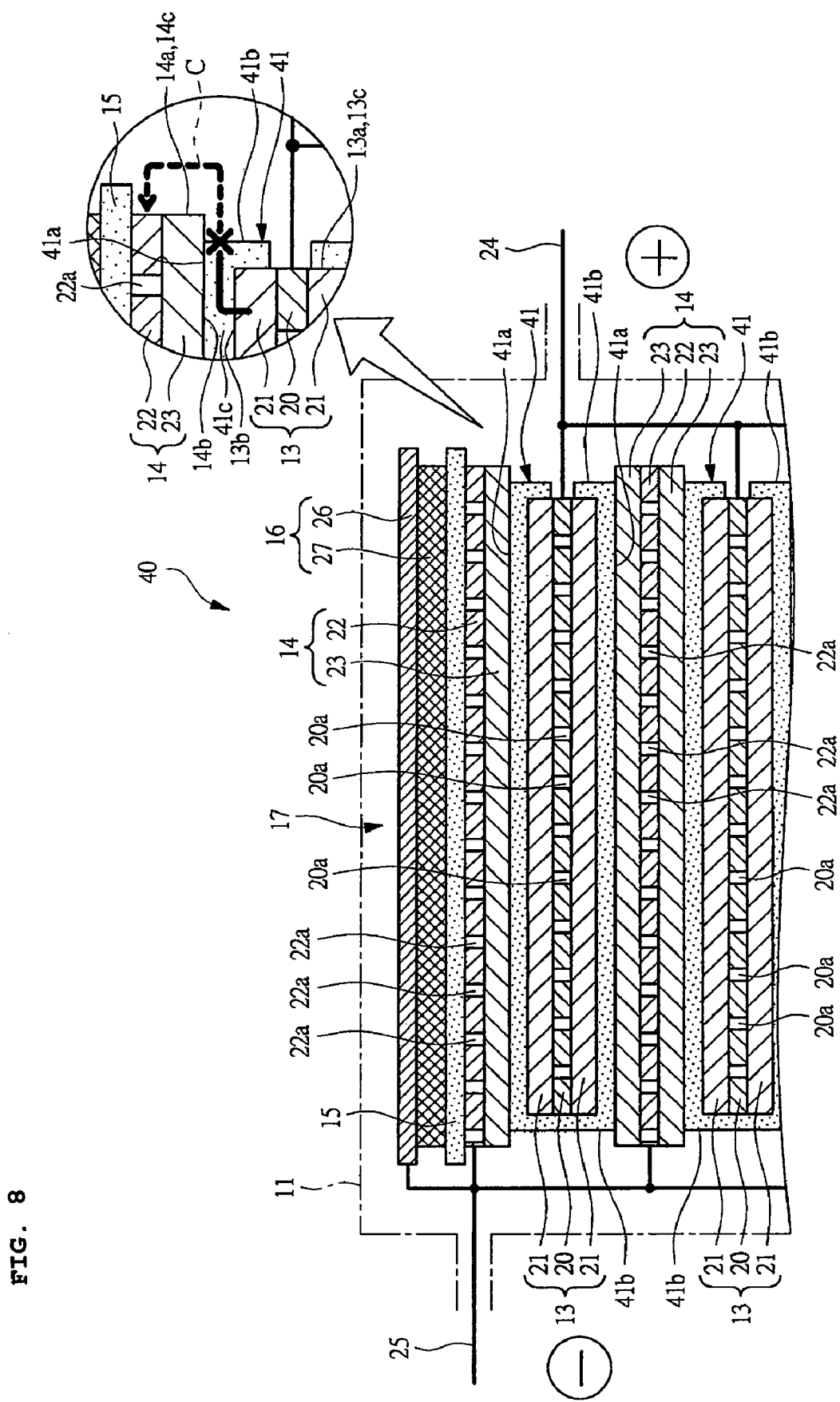
FIG. 8 is a sectional view partially showing the internal structure of an electric storage device according to another embodiment of the present invention.

Next, another embodiment of the present invention will be described. FIG. 8 is a sectional view partially showing an internal structure of an electric storage device 40 according to another embodiment of the present invention. The components same as those shown in FIG. 6 are identified by the same numerals, and the explanation thereof are omitted. As shown in FIG. 8, the negative electrode surface 14b is formed to be larger than the positive electrode surface 13b. Therefore, when the positive electrode 13 and the negative electrode 14 are superimposed, the negative electrode outer edge 14c is located outside of the positive electrode outer edge 13c. A separator 41 is provided between the positive electrode 13 and the negative electrode 14. The separator 41 is formed into a bag-like shape in which one side is open, and the positive electrode 13 is accommodated in the separator 41. The terminal portion of the positive electrode 13 accommodated in the separator 41 projects from the opening portion of the separator 41. The bag-like separator 41 is formed in such a manner that two separator sheets are superimposed, and then three sides of the superimposed separator sheets are sealed. The bag-like separator 41 can be formed in such a manner that a single separator sheet is folded in a half, and then two sides of the folded separator sheet are sealed. The bag-like separator 41 can also be formed by employing a separator sheet that is molded in a bag-like shape beforehand.

The separator surface 41a is formed to be larger than the positive electrode surface 13b and smaller than the negative electrode surface 14b. Specifically, the separator outer edge 41b is arranged outside of the positive electrode outer edge 13c and inside of the negative electrode outer edge 14c. Like the separator 15 of the electric storage device 10 described above, in the separator 41 of the electric storage device 40, the portion that is in contact with both the positive electrode surface 13b and the negative electrode surface 14b serves as the ion passing section 41c.

As described above, the separator outer edge 41b is arranged outside of the positive electrode outer edge 13c and inside of the negative electrode outer edge 14c. Thus, the separator outer edge 41b can function as the ion restricting section. Specifically, as indicated in an enlarged view in FIG. 8, the separator outer edge 41b does not reach the negative electrode end surface 14a. Accordingly, the electrolyte solution is not filled in the vicinity of the negative electrode end surface 14a. Consequently, as indicated by an arrow C in FIG. 8, the moving path of the lithium ions between the positive electrode surface 13b and the negative electrode end surface 14a is blocked by the separator outer edge 41b. By this configuration, even when the electric storage device 40 is charged with a large current, the movement of the lithium ions is restricted by the separator outer edge 41b serving as the ion restricting section. By the restriction of the ion movement, the deposition of the metal lithium on the negative-electrode current collector 22 at the negative electrode end surface 14a can be prevented. Moreover, the safety and quality of the electric storage device 40 can be enhanced. The electric storage device 40 has the bag-like separator 41. Therefore, even when the separator surface 41a is formed to be smaller than the negative electrode surface 14b, the short-circuit between the positive electrode 13 and the negative electrode 14 can surely be prevented. The x mark of the arrow C in FIG. 8 indicates that the movement of the lithium ions is blocked at the separator outer edge 41b at the position marked with x.

Figure 9:
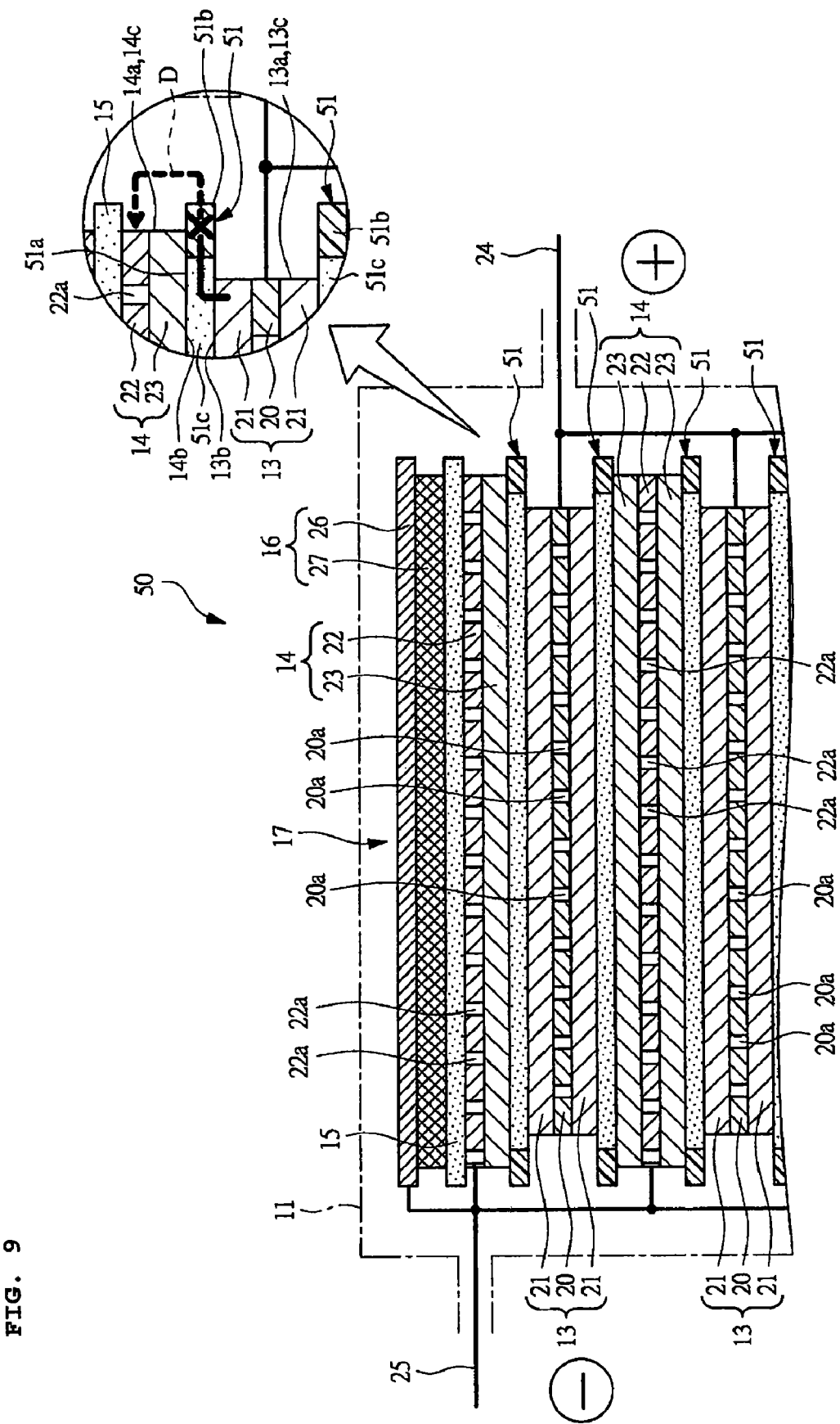
FIG. 9 is a sectional view partially showing the internal structure of an electric storage device according to another embodiment.
Figure 10:
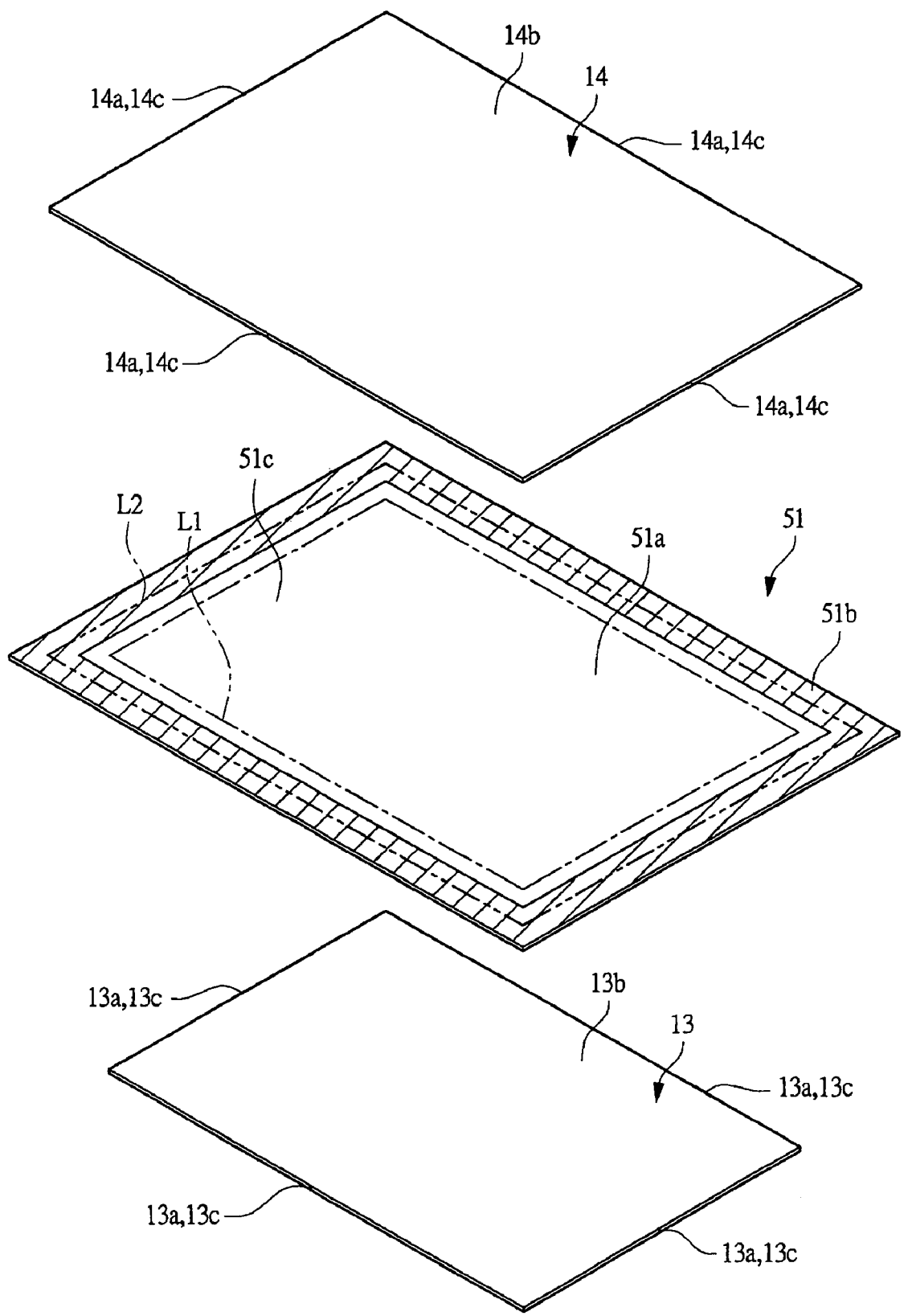
FIG. 10 is an exploded perspective view showing a positive electrode, negative electrode and separator, which constitute the electric storage device according to another embodiment of the present invention.

Next, another embodiment of the present invention will be described. FIG. 9 is a sectional view partially showing an internal structure of an electric storage device 50 according to another embodiment of the present invention. FIG. 10 is an exploded perspective view showing the positive electrode 13, negative electrode 14, and separator 51, which constitute the electric storage device 50. The components same as those shown in FIGS. 3 and 4 are identified by the same numerals, and the explanation thereof are omitted. Like FIG. 4, the one-dot-chain line L1 in FIG. 10 indicates the position of the positive electrode outer edge 13c overlapped with the separator 51. Like FIG. 4, the two-dot-chain line L2 in FIG. 10 indicates the position of the negative electrode outer edge 14c overlapped with the separator 51. The welding parts of the current collectors extending from the positive electrode 13 and the negative electrode 14 are omitted in FIG. 10.

As shown in FIGS. 9 and 10, the separator 51 is provided between the positive electrode 13 and the negative electrode 14. The separator surface 51a is formed to be larger than the positive electrode surface 13b. As indicated by a hatched portion in FIG. 10, a sealing process is performed on the separator outer peripheral portion 51b. The sealing process is for increasing the moving resistance of the lithium ions by sealing the through-holes or gap of the separator 51. For example, when a paper (cellulose) or glass fiber is used as the material of the separator 51, a resin material is applied to the separator outer peripheral portion 51b to perform the sealing process. A gravure printing can be employed as the method of applying the resin material to the separator outer peripheral portion 51b. When a resin such as polyethylene or polypropylene is used as the material of the separator 51, the separator outer peripheral portion 51b is subject to the heat treatment to perform the sealing process. The air permeability of the separator outer peripheral portion 51b can be increased more than the air permeability of the other portion of the separator 51 by performing the sealing process. Like the separator 15 of the electric storage device 10 described above, the area encircled by the one-dot-chain line L1 serves as an ion passing section 51c in the separator 51 of the electric storage device 50.

As shown in FIG. 9, the separator outer peripheral portion 51b, which is subject to the sealing process, is arranged between the positive electrode surface 13b and the negative electrode end surface 14a. By this configuration, the separator outer peripheral portion 51b can function as the ion restricting section. Specifically, as shown by an arrow D in FIG. 9, the lithium ions should pass through the separator outer peripheral portion 51b in order to reach the negative electrode end surface 14a from the positive electrode surface 13b. However, the sealing process is performed on the separator outer peripheral portion 51b. Therefore, the moving path of the lithium ions between the positive electrode surface 13b and the negative electrode end surface 14a is blocked by the separator outer peripheral portion 51b. Accordingly, even when the electric storage device 50 is charged with a large current, the movement of the lithium ions is restricted by the separator outer peripheral portion 51b. By the restriction of the ion movement, the deposition of the metal lithium on the negative-electrode current collector 22 at the negative electrode end surface 14a can be prevented. Moreover, the safety and quality of the electric storage device 50 can be enhanced. The x mark of the arrow D in FIG. 9 indicates that the movement of the lithium ions is blocked at the separator outer peripheral portion 51b at the position marked with x.

The components of the aforesaid each of the electric storage devices will be explained in detail in the following order: [A] positive electrode, [B] negative electrode, [C] negative-electrode current collector and positive-electrode current collector, [D] lithium electrode, [E] separator, [F] electrolyte solution, [G] outer casing.

[A] Positive Electrode

The positive electrode has the positive-electrode current collector and the positive-electrode mixture layer coated on the positive-electrode current collector. The positive-electrode active material contained in the positive-electrode mixture layer is not particularly limited, so long as it allows ions to be reversibly doped thereinto and de-doped therefrom. Examples of the positive-electrode active materials include activated carbon, transition metal oxide, conductive polymer, polyacene-based substance, and the like.

For example, preferably the activated carbon is made of an activated carbon grain that is subject to an alkali activation treatment and has a specific surface area of not less than 600 m$^2$/g. A phenolic resin, petroleum pitch, petroleum coke, coconut husk, coal-derived coke, and the like are used as the material of the activated carbon, wherein it is preferable to use the phenolic resin or coal-derived coke, since they can increase the specific surface area. Preferable alkali activators used for the alkali activation treatment of the activated carbons include salts or hydroxides of a metal ion such as lithium, sodium, potassium, and the like, wherein potassium hydroxide is more preferable. Examples of the methods of the alkali activation include the method in which a carbide and an activator are mixed, and then the resultant is heated in an airflow of inert gas, the method in which an activator is carried on a raw material of an activated carbon beforehand, the resultant is heated, and then a carbonizing process and activating process are performed, the method in which a carbide is activated with a gas activation by using water vapors, and then the resultant is surface-treated with an alkali activator. The activated carbon to which the alkali activation treatment is performed is pulverized by means of a known pulverizer such as a ball mill. The grain size within a generally used wide range can be applied. For example, it is preferable that $D_{50}$ is 2 μm or more, more preferably 2 to 50 μm, and most preferably 2 to 20 µm. Further, the activated carbon preferably having an average pore diameter of 10 nm or less and a specific surface area of 600 to 3000 m$^2$/g is preferable. More preferably, an activated carbon having a specific surface area of 800 m$^2$/g or more, particularly 1300 to 2500 m$^2$/g is preferable.

A vanadium pentoxide ($V_2O_5$) or a lithium cobalt oxide ($LiCoO_2$) can be contained as the positive-electrode active material in order to increase the capacity of the positive-electrode mixture layer. Examples of the other materials include a lithium-containing metal oxide represented by a chemical formula of $Li_xM_yO_z$ (x, y, z are positive numbers, M is a metal, or may be metals of two or more types), such as $Li_xCoO_2$, $Li_xNiO_2$, $Li_xMnO_2$, and $Li_xFeO_2$, or an oxide or a sulfide of a transition metal such as cobalt, manganese, vanadium, titanium, and nickel. In a case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt-nickel compound oxide.

The positive-electrode active material described above such as the activated carbon is formed into a powdery shape, granular shape, short fibrous shape, and the like, and this positive-electrode active material is mixed with a binder to form a slurry. The slurry containing the positive-electrode active material is coated on the positive-electrode current collector and the resultant is dried, whereby the positive-electrode mixture layer is formed on the positive-electrode current collector. Usable binders to be mixed with the positive-electrode active material include rubber binder such as SBR, fluorine-containing resin such as polytetrafluoroethylene, and polyvinylidene fluoride, thermoplastic resin such as polypropylene, polyethylene, and polyacrylate. A conductive material such as acetylene black, graphite, metal powder, and the like can appropriately be added to the positive-electrode mixture layer.

[B] Negative Electrode

The negative electrode has the negative-electrode current collector and the negative-electrode mixture layer coated on the negative-electrode current collector. The negative-electrode active material contained in the negative-electrode mixture layer is not particularly limited, so long as it allows ions to be reversibly doped thereinto and de-doped therefrom. Examples of the negative-electrode active material include graphite, various carbon materials including hard carbon (non-graphitizable carbon) and polyacene-based material, tin oxide, silicon oxide, and the like. The graphite and hard carbon material are preferable as the negative-electrode active material, since they can increase the capacity. Further, a polyacene-based organic semiconductor (PAS) that is a heat-treated material of an aromatic condensation polymer is preferable for a negative-electrode active material, since it can increase the capacity. The PAS has a polyacene skeletal structure. The ratio (H/C) of a number of hydrogen atoms to a number of carbon atoms is preferably within the range of not less than 0.05 and not more than 0.50. When the H/C of the PAS exceeds 0.50, the aromatic polycyclic structure is not sufficiently grown, so that the lithium ions cannot smoothly be doped or de-doped. Therefore, the charging/discharging efficiency of the electric storage device 10 might be reduced. When the H/C of the PAS is less than 0.05, the capacity of the electric storage device might be reduced.

The aforesaid negative-electrode active material such as PAS is formed into a powdery shape, a granular shape or short fibrous shape. This negative-electrode active material is mixed with a binder to form a slurry. The slurry containing the negative-electrode active material is coated on the negative-electrode current collector and the resultant is dried, whereby the negative-electrode mixture layer is formed on the negative-electrode current collector. Usable binders to be mixed with the negative-electrode active material include fluorine-containing resin such as polytetrafluoroethylene, polyvinylidene fluoride, and the like, thermoplastic resin such as polypropylene, polyethylene, and polyacrylate, and a rubber binder such as styrene butadiene rubber (SBR), and the like. The fluorine-based binder is preferably used. Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene, and the like. A conductive material such as acetylene black, graphite, metal powder, and the like can appropriately be added to the negative-electrode mixture layer.

[C] Positive-Electrode Current Collector and Negative-Electrode Current Collector The positive-electrode current collector and the negative-electrode current collector preferably have through holes penetrating therethrough. Examples of the current collector include an expanded metal, punching metal, etching foil, net, expanded member, and the like. The shape and number of the through hole are not particularly limited, and they can be appropriately set so long as they do not hinder the movement of the anions or lithium ions. Various materials generally proposed for a battery or a capacitor can be employed as the material of the negative-electrode current collector and the positive-electrode current collector. For example, aluminum, stainless steel or the like can be used as the material of the positive-electrode current collector. Stainless steel, copper, nickel, and the like can be used as the material of the negative-electrode current collector.

[D] Lithium Electrode

Various materials generally proposed as a current collector of a battery or a capacitor can be used as the material of the lithium-electrode current collector. Examples of these materials include a stainless steel, copper, nickel, or the like. The lithium-electrode current collector may have through-holes penetrating therethrough, such as an expanded metal, punching metal, etching foil, net, expanded member, and the like. A material of the lithium ion source to be adhered onto the lithium-electrode current collector may be the one that can emit lithium ions. Usable materials include metal lithium, lithium-aluminum alloy, and the like.

[E] Separator

A porous member or the like having durability against the electrolyte solution, positive-electrode active material, negative-electrode active material, or the like, having an open cell and having no electron conductivity can be used as the separator. Generally, a cloth, nonwoven fabric, or porous body made of paper (cellulose), glass fiber, polyethylene, polypropylene, and the like is used. The thickness of the separator may appropriately beset considering the holding amount of the electrolyte solution, strength of the separator, or the like. The thickness of the separator is preferably thin in order to reduce the internal resistance of the electric storage device.

[F] Electrolyte Solution

It is preferable that an aprotic organic solvent containing a lithium salt is used as the electrolyte solution from the viewpoint that an electrolysis is not produced even by a high voltage and lithium ions can stably be present. Examples of the aprotic organic solvent include ethylene carbonate, propylene carbonate, dimethyl carbonate, diethyl carbonate, γ-butyloractone, acetonitrile, dimethoxyethane, tetrahydrofuran, dioxolane, methylene chloride, sulfolane, and the like, wherein these material are used singly or mixed with one another. Examples of the lithium salt include $LiClO_4$, $LiAsF_6$, $LiBF_4$, $LiPF_6$, $LiN(C_2F_5SO_2)_2$, and the like. Further, the concentration of the electrolyte in the electrolyte solution is preferably set to at least 0.1 mol/L or more, and more preferably set within the range of 0.5 to 1.5 mol/L, in order to reduce the internal resistance due to the electrolyte solution.

Ionic liquid can be employed instead of the organic solvent. The combination of various cations and anions is proposed as the ionic liquid. Examples of the cations include N-methyl-N-propylpiperidinium (PP13), 1-ethyl-3-methyl-imidazolium (EMI), diethyl-methyl-2-methoxyethyl-ammonium (DEME), and the like. Examples of the anions include bis(fluorosulfonyl)-imide (FSI), bis(trifluoromethanesulfonyl)-imide (TFSI), $PF_6$-$BF_4$-, and the like.

[G] Outer Casing

Various materials generally used for a battery can be used for the outer casing. A metal material such as iron or aluminum can be used, and a film material or the like made of resin can be used. The shape of the outer casing is not particularly limited. The outer casing can be formed into a shape appropriately selected according to the purpose, such as a cylindrical shape or rectangular shape. From the viewpoint of miniaturization or reduced weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used.

The present invention is not limited to the aforesaid embodiments, and various modifications are possible without departing from the scope of the present invention. For example, the lithium electrode and the positive electrode can be connected so as to dope the lithium ions into the positive electrode. Alternatively, the lithium electrode can be provided to the positive electrode and the negative electrode respectively, or the positive electrode and the negative electrode can be short-circuited during the doping, whereby the lithium ions may be doped into both the positive electrode and the negative electrode. The present invention can be applied not only to a laminate-type electric storage device, but also to a wound-type electric storage device.

What is claimed is:

1. An electric storage device comprising:
a positive electrode; a negative electrode having a negative electrode surface larger than a positive electrode surface; and
a separator arranged between the positive electrode and the negative electrode that are opposite to each other,
wherein a positive electrode active material contained in the positive electrode allows ions to be reversibly doped thereinto and de-doped therefrom;
wherein a negative electrode active material contained in the negative electrode allows ions to be reversibly doped thereinto and de-doped therefrom;
wherein the positive electrode is arranged not to protrude from the negative electrode;
wherein the separator is provided with an ion passing section that is in contact with the positive electrode surface and the negative electrode surface so as to allow the movement of ions between the surfaces, and an ion restricting section that is positioned at the outer peripheral portion of the ion passing section for restricting the movement of ions from the positive electrode surface to an end surface of the negative electrode, and
wherein the separator is formed to be larger than the positive electrode surface and to be smaller than the negative electrode surface, and an outer edge of the separator is arranged outside of an outer edge of the positive electrode and inside of an outer edge of the negative electrode.

2. The electric storage device according to claim 1, wherein an outer edge of the positive electrode and an outer edge of the negative electrode are apart from each other by 2 mm or more and 15 mm or less.

3. The electric storage device according to claim 1, wherein the separator is formed into a bag-like shape, and the positive electrode is accommodated in the separator.

4. The electric storage device according to claim 1, wherein a sealing process is performed to the outer peripheral portion of the separator not crossing over the ion restricting section.

5. The electric storage device according to claim 4, wherein the sealing process is application of a resin material.

6. The electric storage device according to claim 4, wherein the separator is a thermoplastic material, and the sealing process is heating treatment.

7. The electric storage device according to claim 1, further comprising: an ion supply source that is connected to at least one of the positive electrode and the negative electrode for doping ions into at least one of the positive electrode and the negative electrode.

8. The electric storage device according to claim 1, wherein a current collector between the positive electrode and the negative electrode has through-holes formed therethrough.

9. The electric storage device according to claim 1, wherein the potential of the positive electrode when the positive electrode and the negative electrode are short-circuited is 2.0V or less (vs. $Li/Li^+$).

10. The electric storage device according to claim 1, wherein the negative electrode active material contained in the negative electrode has a capacitance per negative electrode active material weight three times or more larger than a capacitance of the positive electrode active material per positive electrode active material weight contained in the positive electrode, and the weight of the positive electrode active material is larger than the weight of the negative electrode active material.

11. The electric storage device according to claim 1, wherein the positive electrode active material is activated carbon, lithium-containing transition metal oxide, transition metal oxide, transition metal sulfide, conductive polymer, or polyacene-based substance.

12. The electric storage device according to claim 1, wherein the negative electrode active material includes material selected from the group consisting of graphite, hard carbon, polyacene-based material, tin oxide, and silicon oxide lithium.

* * * * *